J. B. STEARNS.
Improvement in Duplex Telegraph Apparatus.
No. 132,933.  Patented Nov. 12, 1872.
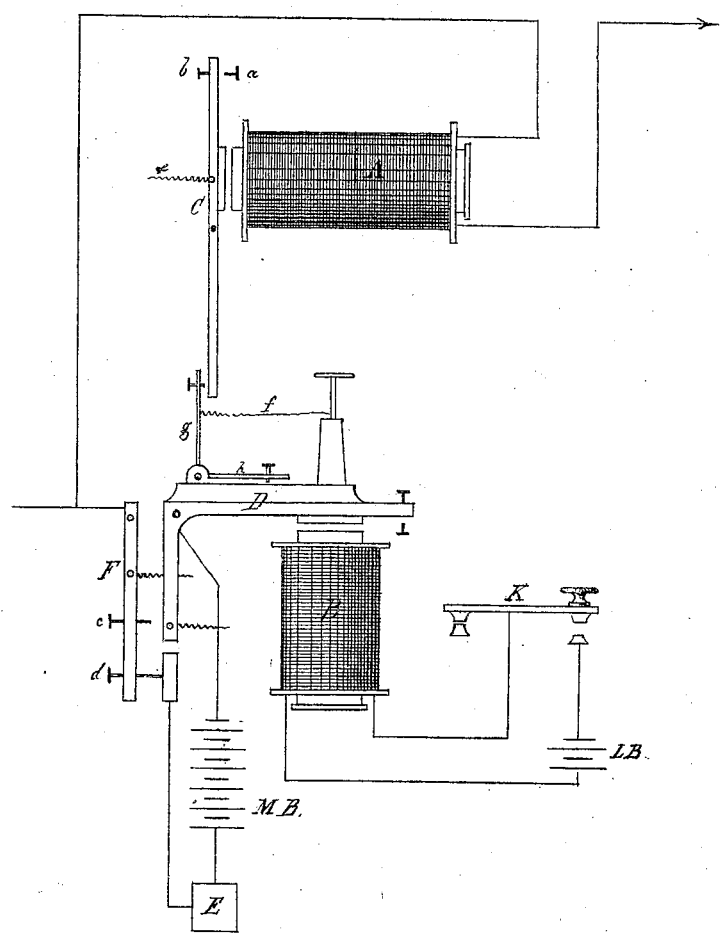

UNITED STATES PATENT OFFICE.

JOSEPH B. STEARNS, OF BOSTON, MASSACHUSETTS.

IMPROVEMENT IN DUPLEX TELEGRAPH APPARATUS.

Specification forming part of Letters Patent No. 132,933, dated November 12, 1872.

*To all whom it may concern:*

Be it known that I, JOSEPH B. STEARNS, of Boston, in the county of Suffolk and Commonwealth of Massachusetts, have invented an Improvement in Telegraph Apparatus, of which the following is a specification:

This invention relates to apparatus for the simultaneous transmission of two dispatches or signals from opposite ends of the same line-wire; and consists in the combination, with the receiving-magnet, of a device which, by mechanical means, prevents said magnet from responding to the signals transmitted from the home station, but does not prevent it from responding to signals from the distant station.

The accompanying drawing making part of this specification represents my apparatus, in which—

A is the receiving-magnet. B is a magnet operated by a local battery, L B, and an ordinary lever-key, K. C is the armature-lever of the receiving-magnet; a b, its contact stops; e, its spring; D, the armature-lever of the local electro-magnet; E, the earth-plate; F, a part of the frame supporting the electro-magnet B, and placed in the circuit from the main battery M B, and provided with stops c d; g and h, the arms of a bent lever pivoted to the armature-lever D; and f, a spring connected to the lever g.

The apparatus operates as follows: On closing the local circuit from the battery L B by the depression of the lever K, the electro-magnet B is excited and its armature-lever D is attracted and comes in contact with the stop c, moving the bar F and breaking contact at d, thereby closing the circuit with the main battery M B, and transmitting a signal over the line through the receiving-magnet A. The armature-lever would move and a signal be given at the home station were not the arm g of the bent lever, pivoted to the armature-lever D, brought against the lengthened extremity of the armature-lever C so that it cannot move, and thus, though a signal is transmitted through the receiving-magnet, which is always in the circuit to the distant station, said magnet does not respond. If, however, at the same time a current be transmitted from the distant station, the power of the electro-magnet A is increased; a greater force is exerted on the armature-lever C; the resistance of the spring f attached to the lever g is overcome, and the armature-lever moves, giving a signal. If one of these instruments is placed at each end of the line, respectively, both can be operated simultaneously, and two signals be transmitted, one from either station, at the same time. When the distant station only is sending, the lever g rests, without exerting any pressure, against the end of the lever C, and when the armature is attracted the spring f yields and allows the lever to move.

Claim.

What I claim as my invention, and desire to secure by Letters Patent of the United States, is—

The combination of the receiving-magnet A, electro-magnet B, armature-lever C, armature-lever D, and bent lever g h, as and for the purpose as set forth.

J. B. STEARNS.

Witnesses:
    WILLIAM A. HAYES, Jr.,
    SAMUEL SNOW.